US012060747B2

(12) United States Patent
Irvine et al.

(10) Patent No.: US 12,060,747 B2
(45) Date of Patent: Aug. 13, 2024

(54) BREAKAWAY SASH LUG FOR HUNG WINDOWS

(71) Applicant: JELD-WEN, Inc., Charlotte, NC (US)

(72) Inventors: Travis Irvine, Klamath Falls, OR (US); Jacob D. Anderson, Bend, OR (US); Ryan Ellwanger, Hawkins, WI (US)

(73) Assignee: JELD-WEN, Inc., Charlotte, NC (US)

( * ) Notice: Subject to any disclaimer, the term of this patent is extended or adjusted under 35 U.S.C. 154(b) by 558 days.

(21) Appl. No.: 17/335,555

(22) Filed: Jun. 1, 2021

(65) Prior Publication Data

US 2022/0381082 A1 Dec. 1, 2022

(51) Int. Cl.
*E06B 3/00* (2006.01)
*E06B 3/44* (2006.01)

(52) U.S. Cl.
CPC ........ *E06B 3/44* (2013.01); *E06B 2003/4484* (2013.01); *E06B 2003/4492* (2013.01)

(58) Field of Classification Search
CPC ............... E06B 3/44; E06B 2003/4484; E06B 2003/4492
USPC ............................................................ 49/501
See application file for complete search history.

(56) References Cited

U.S. PATENT DOCUMENTS 5,218,807 A * 6/1993 Fulford ..................... B32B 5/32 49/501
5,915,550 A 6/1999 Gartz
6,053,458 A 4/2000 Meyer
7,073,292 B1 * 7/2006 Minter ................ E05B 65/0876 49/446
7,165,852 B2 1/2007 Pavao et al.
7,264,219 B2 9/2007 Kicher et al.
8,191,313 B2 * 6/2012 Ito ......................... E06B 3/5063 49/458
8,651,165 B2 2/2014 Huynh et al.
2002/0194810 A1 * 12/2002 Conachen ................. E06B 3/44 52/716.2
2006/0248803 A1 * 11/2006 Kirk ...................... E06B 3/9642 49/458

(Continued)

FOREIGN PATENT DOCUMENTS

GB 2349667 A * 11/2000 ............... E06B 1/36

OTHER PUBLICATIONS

"Installation Instruction Exterior Sash Lug for Architect Series® Monumental® Aluminum Clad Hung", pp. 1-2 [Retrieved on Nov. 21, 2023], chrome-extension://efaidnbmnnnibpcajpcglclefindmkaj/https://media.pella.com/professional/installation/81X50000.pdf (Pella) (Year: 2016) (Year: 2016).*

(Continued)

*Primary Examiner* — Hiwot E Tefera
*Assistant Examiner* — Daniel Alvarez
(74) *Attorney, Agent, or Firm* — Lorenz & Kopf LLP

(57) ABSTRACT

A breakaway sash lug assembly for a hung window includes a sash mount seat attachable to a window sash and a lug body rigidly attached to the sash mount seat via a releasable coupling that is configured to release at least one side of the lug body from the sash mount seat upon application a relatively small external force on the lug body. The releasable coupling may inhibit damage from inadvertent contact between the lug body and other portions of the hung window, for example during tilting of the sash for cleaning. The releasable coupling may include a hinge and a latch and/or a snap attachment.

19 Claims, 4 Drawing Sheets

(56) References Cited

U.S. PATENT DOCUMENTS

| | | | | |
|---|---|---|---|---|
| 2019/0153759 | A1 | 5/2019 | White | |
| 2020/0109593 | A1* | 4/2020 | Kunkel | E06B 3/4407 |
| 2021/0381301 | A1* | 12/2021 | Kellum | E05D 15/16 |

OTHER PUBLICATIONS

Translation of GB2349667 (Year: 2000).*
Sapa AS, Design Manual—Success with Aluminum Profiles, 2014, 3 pages (p. 58).
Relcross Ltd., Hinges & Pivots for Specifiers, Architectural Ironmongers & Door Hardware Specialists, 2008, 20 pages (see pp. 18-19).
Marvin Lumber and Cedar Company, Ogee Lug—Field Applied Instruction—Ultimate Wood Double Hung, Jul. 29, 2019, 1 page.
Pella Corporation, Installation Instruction Exterior Sash Lug for Architect Series Aluminum Clad Hung, 2016, 2 pages.

* cited by examiner

BREAKAWAY SASH LUG FOR HUNG WINDOWS

TECHNICAL FIELD

The field of the present disclosure relates to windows and fenestration systems, and particularly to simulated sash lugs for single-hung and double-hung windows.

BACKGROUND

Sash lugs are an element of vintage single-hung windows that are attached to lower corners of a fixed (non-movable) upper sash of the window. Conventional sash lugs provide structural support for the upper sash by way of attachment of the lug to the window frame. The most common style of sash lug has an ornamental profile in the shape of an ogee curve, and is known in the art as an ogee lug. It is known for modern double-hung windows to include non-functional ornamental sash lugs that match the ornamental architectural appearance of vintage windows, to facilitate use as replacement windows in a home having other existing vintage windows wish sash lugs. Such modern non-functional ornamental sash lugs (which are also referred to herein as "simulated sash lugs" or "simulated ogee lugs") are typically offered an option on a window, or as an aftermarket accessory that is installed in the field by a window installer. Unlike a conventional vintage sash lug, a simulated sash lug is typically attached only to the upper sash, and not to the frame of the window unit, and does not typically provide any structural support for the upper sash.

One such simulated sash lug is offered by Pella Corporation. The prior-art Pella sash lug is attached to a movable upper sash that is tiltable for cleaning. The Pella sash lug must be removed from the window before the upper sash is tilted, to avoid damaging the window screen, the sash lug, or other elements of the window system. In the Pella design, the sash lug is removed from the upper sash by twisting the sash lug on its mount about a vertical axis, then depressing a locking tab and sliding the sash lug off a mounting plate that remains affixed to the upper sash.

The present inventors have recognized a need for a simulated sash lug having a more user-friendly design that avoids possible damage to the window.

BRIEF DESCRIPTION OF THE DRAWINGS

Aspects and advantages of the invention will be apparent from the detailed description of preferred embodiments set forth below, which proceeds with reference to the accompanying drawings, of which.

DETAILED DESCRIPTION OF PREFERRED EMBODIMENTS

Figure 1:
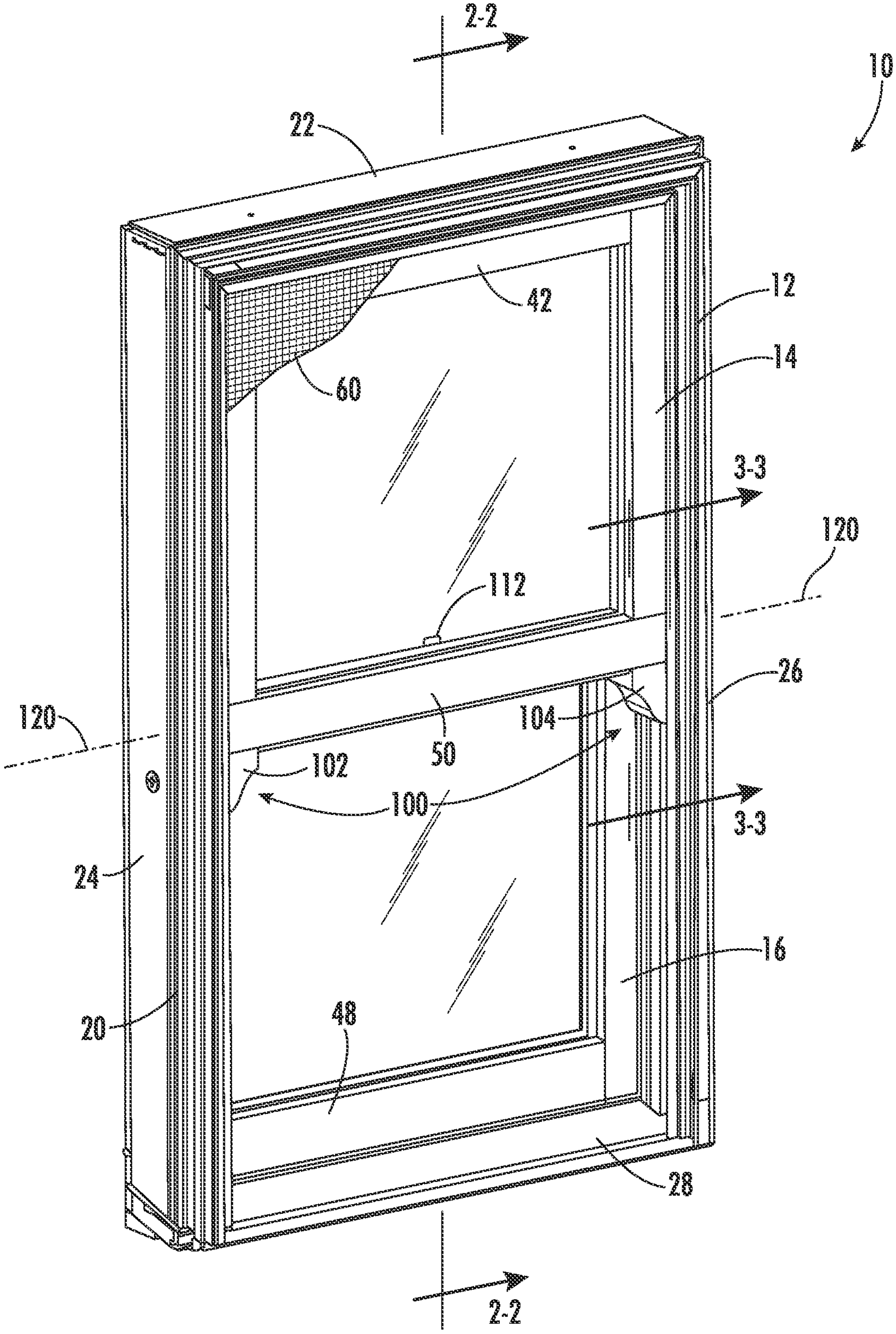
FIG. 1 is a partially cutaway perspective view of a double-hung window unit with a breakaway ogee lug according to a preferred embodiment of the present invention.

FIG. 1 illustrates a sliding double-hung window providing a typical foundation and environment of use for a detachable breakaway sash lug assembly according to a preferred embodiment. And while details of a double-hung tilt window are described herein, it should be appreciated that detachable sash lug assemblies according to the present disclosure may be utilized on other types of windows and fenestration systems, such as single hung windows and other hung windows. Moreover, certain elements, features, and attributes of the detachable lug assemblies disclosed herein may be used in connection with other elements of windows, doors, and other fenestration systems.

Figure 2:
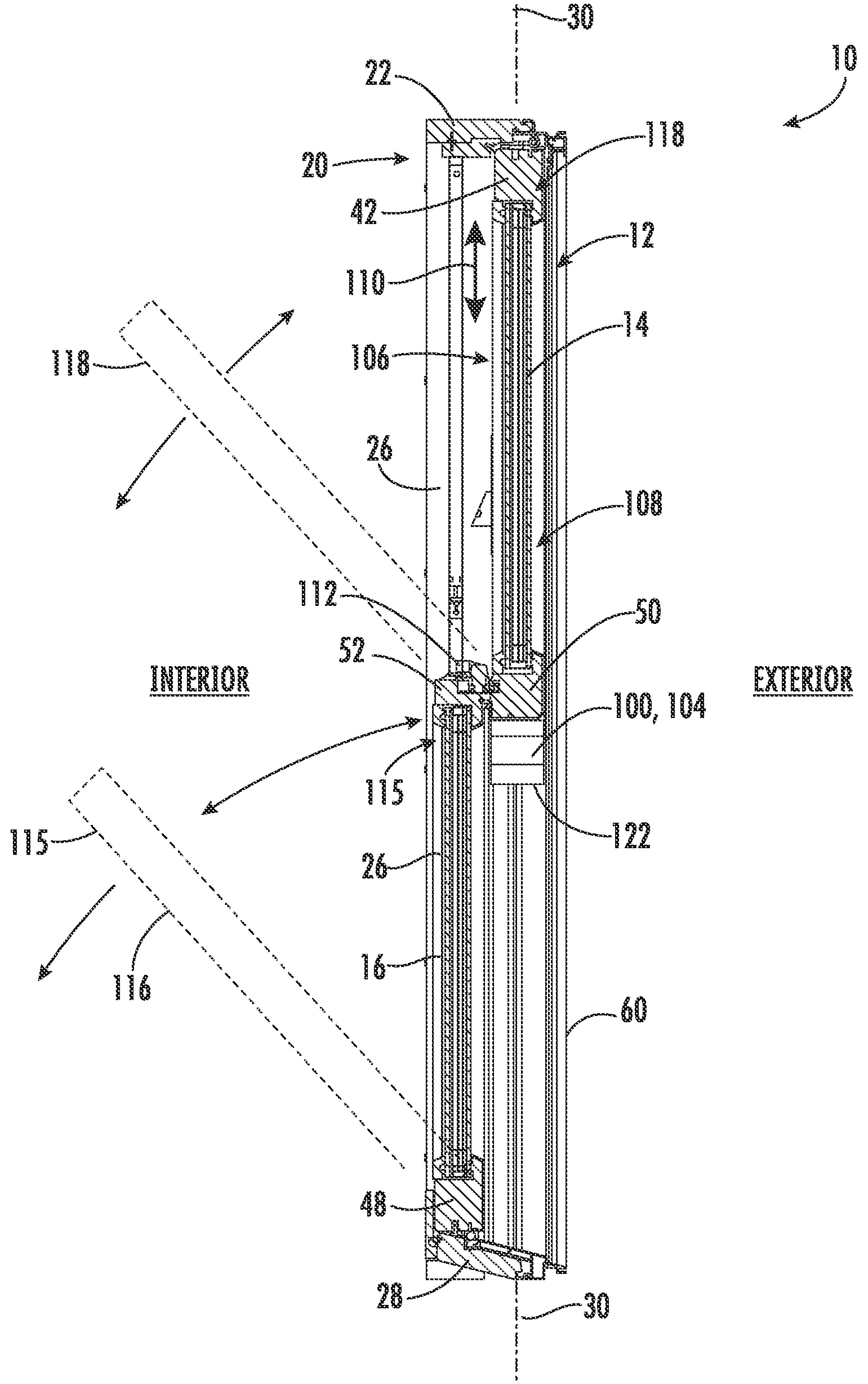
FIG. 2 is a vertical section view of the window of FIG. 1, taken along line 2-2 in FIG. 1.
Figure 3:
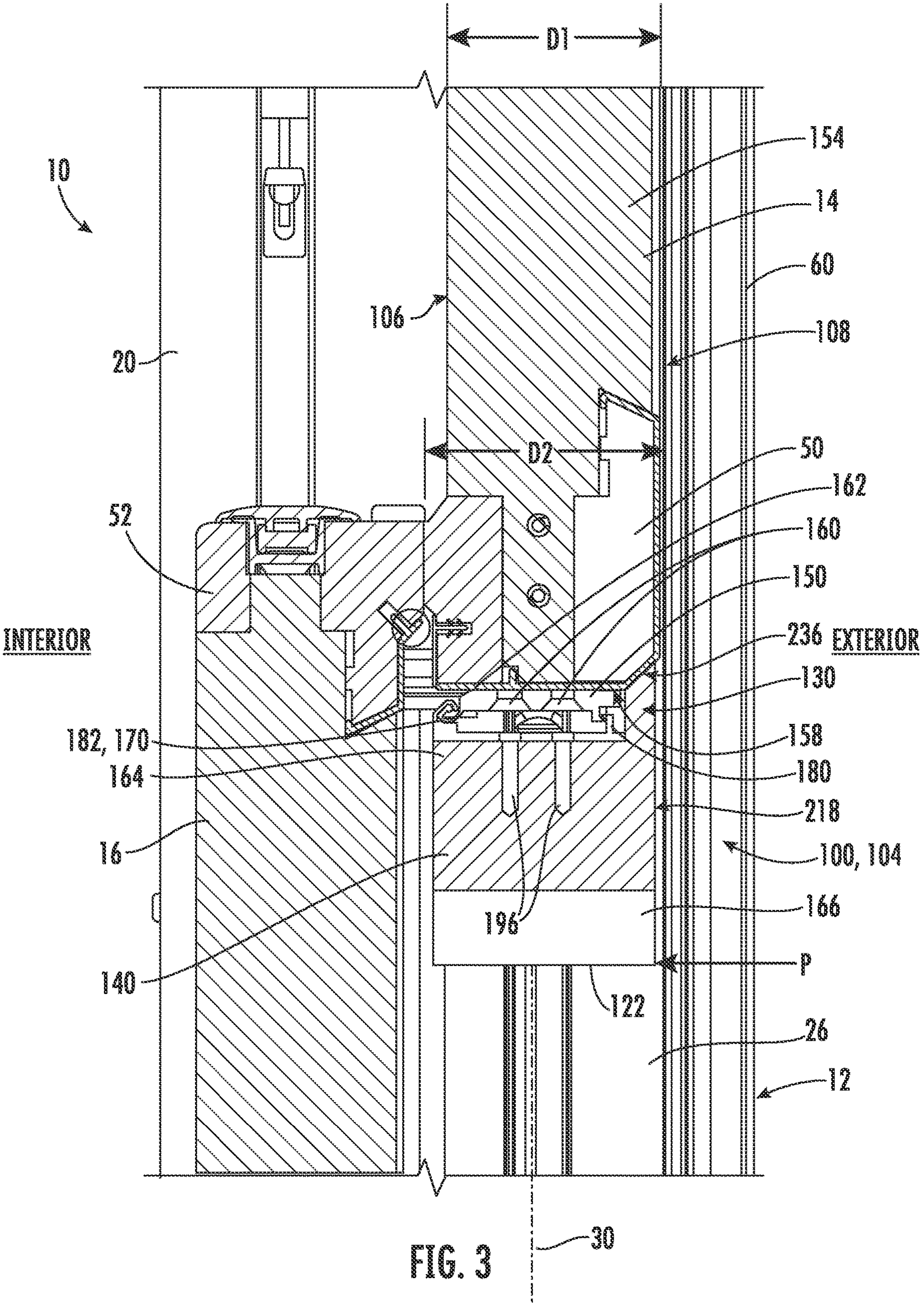
FIG. 3 is an enlarged partial section view of a portion of the window of FIG. 1, taken along line 3-3 in FIG. 1, showing detail of meeting rails and the breakaway ogee lug.

FIG. 1 is a perspective view of a hung window 10 according to a preferred embodiment showing an exterior side 12 of window 10, as viewed from a perspective that is exterior of a building (not illustrated) in which window 10 is to be installed. Hung window 10 is preferably a double-hung window including a upper sash 14 and a lower sash 16, both slidably mounted within a frame 20 of window 10 for vertical movement within frame 20. The frame 20 conventionally includes a header 22, spaced-apart first and second jambs 24 and 26, and a sill 28 spaced below header 22, all lying in a plane 30 (FIG. 2) and defining a rectangular fenestration opening within which the upper and lower sashes 14 and 16 are mounted. Upper sash 14 is mounted toward the exterior from lower sash 16, and lower sash 16 is conversely mounted toward the interior of the building relative to upper sash 14. When the upper and lower sashes 14 and 16 are in a closed position, as illustrated, a top rail 42 of the upper sash 14 abuts header 22, a bottom rail 48 of lower sash 16 abuts sill 28, and meeting rails (or check rails) 50 and 52 of the respective upper and lower sashes 14 and 16 are positioned adjacent each other in overlapping relation, as best illustrated in FIGS. 2 and 3. An insect screen 60 (shown partially/cut-away in FIG. 1 to avoid obscuring other details of window 10) is mounted along the exterior side 12 of window 10, spaced apart outwardly from upper sash 14 and substantially parallel to plane 30. A pair of sash lug assemblies 100 includes a first ornamental ogee lug 102 and a second ornamental ogee lug 104, secured to opposite ends of meeting rail 50 of the movable upper sash 14, as further described below, but are not typically secured to jambs 24 and 26, so may be considered non-functional "simulated sash lugs" as described above in the Background section. It should be noted that the sash lug assemblies 100 may be formed with various shape profiles and ornamental appearances, which include shape profiles other than ogee curves, so the embodiments illustrated as ogee lugs 102 and 104 are merely exemplary in shape and appearance.

FIG. 2 is a vertical cross-section view of window 10 taken along line 2-2 in FIG. 1. With reference to FIG. 2, sashes 14, 16 have opposite interior and exterior sides 106, 108 facing the respective interior and exterior of a building in which window 10 is installed. Upper sash 14 is normally positioned in plane 30 and movable vertically within frame 20 in the directions indicated by arrows 110. Similarly, lower sash 16 is normally mounted parallel to plane 30, spaced therefrom toward the interior and movable within frame 20 in the same vertical directions 110. When the sashes 14, 16 are closed, as illustrated, the meeting rail 50 of upper sash 14 is positioned in overlapping relation with meeting rail 52 of lower sash 16, and a sash lock 112 may optionally lock both meeting rails 50, 52 together, preventing upper and lower sashes 14, 16 from being opened. After first releasing the sash lock 112, lower sash 16 can be moved upwardly away from the closed position to a slightly open position whereat tilt latches (not illustrated) near its meeting rail 52 can be released to allow the upper portion 115 of lower sash 16 to be tilted inwardly and downwardly for cleaning, as illustrated by phantom lines 116. Lower sash 16 is tiltable about pivot pins (not shown) that pivotably support the ends of bottom rail 48 of lower sash 16 on the jambs 24, 26. Similarly, upper sash 14 is tiltable inwardly about pivot pins (not shown) which pivotably support the ends of meeting rail 50 of upper sash 14 on jambs 24, 26. Typically, the upper sash 14 must be slid open slightly downward before releasing tilt latches (not shown) near its top rail 42 and tilting an upper portion 118 of upper sash 14 inwardly and downwardly for cleaning, as illustrated by phantom lines 114.

Because the sash lug assemblies 100 extend downwardly from meeting rail 50 and are located mostly or entirely below a tilt axis 120 defined by the pivot pins that attach meeting rail 50 to frame 30, a lowermost free end 122 of each sash lug assembly 100 would ordinarily move outwardly (toward the exterior) when upper sash 14 is tilted for cleaning. Insect screen 60, frame 30, or other elements of window 10 would interfere with such outward movement and be damaged (or the sash lug assembly 100 itself damaged) if sash lug assemblies 100 are not detached or otherwise released from upper sash 14 before upper sash 14 is tilted. The present inventors have therefore devised sash lug assemblies 100 that are attached to upper sash 14 via force-releasable couplings that release when upper sash 14 is titled, to thereby inhibit damage from inadvertent contact between sash lug assembly 100 and other elements of window 10 such as insect screen 60. Embodiments of such force-releasable couplings are described in detail below and are sometimes referred to herein as "breakaway" couplings for convenience, although it is not typically necessary or desirable for any element of the couplings or the sash lug assemblies 100 to actually be broken in order for the sash lug assemblies 100 to be partially or totally released from upper sash 14.

Turning now to FIG. 3, which is an enlarged vertical cross section taken along lines 3-3 in FIG. 1, the "breakaway" sash lug assembly 100 according to one generic embodiment includes a releasable coupling 130 that releasably but rigidly attaches a lug body 140 of the sash lug assembly 100 to upper sash 14 via a sash mount seat 150. The sash mount seat 150 is sized and configured for attachment to meeting rail 50 and preferably is sized to have a depth that is less than a depth D1 of a stile 154 of upper sash 14 or less than a depth D2 of meeting rail 50, so that sash mount seat 150 is attachable to an underside 158 of meeting rail 50 and within its boundaries. In the embodiment illustrated, sash mount seat 150 includes a plate that is fastened to meeting rail 50 via a pair of screws 160 inserted through holes 161 (FIG. 5) in the plate of the sash mount seat 150. In other embodiments (not illustrated), sash mount seat 150 may have a different shape and may be fastened or secured to meeting rail 50 in another manner. In still other embodiments, sash mount seat 150 may be sized to have a depth larger than D2 and/or may attach to interior and/or exterior sides of meeting rail 50. In yet other embodiments, sash mount seat 150 may be integrated with meeting rail 50 or formed in metal cladding 162 overlying the meeting rail 50.

An upper part 164 of lug body 140 is rigidly but releasably attached to sash mount seat 150 via releasable coupling 130, and a lower part 166 of lug body 140 has a free end 122 that projects downwardly away from meeting rail 50 and sash mount seat 150. Releasable coupling 130 is preferably configured to release at least one side or portion of lug body 140 (e.g. an exterior side 218) from sash mount seat 150 upon or in response to the application of a force of no less than 0.1 pounds-force (lbf) (0.445 Newtons (N)), and more preferably no less than 0.25 lbf (1.112 N), to free end 122 in a direction P perpendicular to plane 30. In some embodiments, releasable coupling 130 is configured to release at least one side or portion of lug body 140 from sash mount seat 150 in response to the application of force to free end 122 in direction P, wherein the force falls in the range of between 0.1 lbf (0.445 N) and 50 lbf (222 N). In other embodiments, the releasable coupling may release by such a force of at least 0.1, 0.25, 1.0, 2.0, 3.0, 4.0, or 5.0 lbf (4.5, 8.9, 13.3, 17.8, or 22.2 N), but desirably does not require more than 50 lbf (222 N) for release, and more preferably not more than 40, 30, or 15 lbf (178, 133, or 67 N), depending on the type of window or usage. Various releasable couplings and mechanisms are possible for providing such rigid, but force-releasable coupling as will be well understood by persons skilled in the art. One such releasable coupling includes a hinge 170 and a latch 180 spaced apart from the hinge, as illustrated and further described below with reference to FIGS. 4 and 5. In some embodiments, releasable coupling 130, or the latch 180 thereof, may include a snap attachment, such as a snap latch or grab latch, or a hook, clip or other force-releasable structure. Still other embodiments may include a magnetic attachment, alone or in combination with a hinge.

Figure 4:
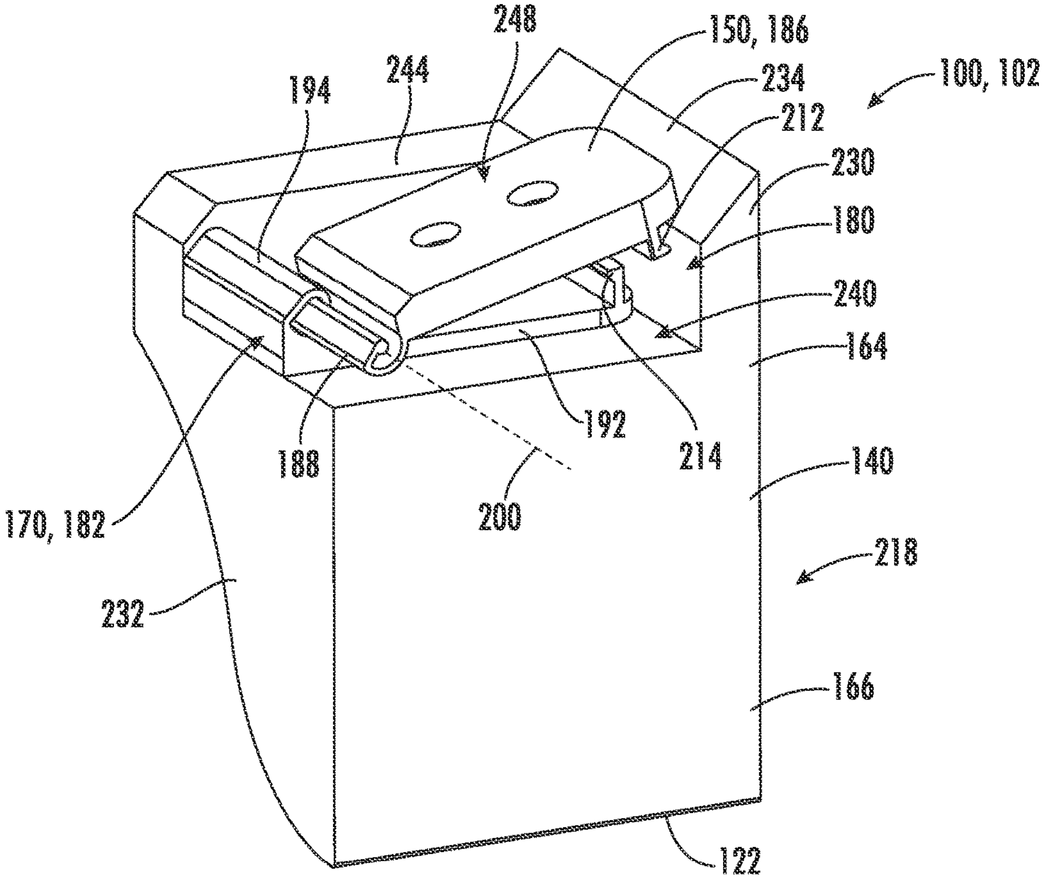
FIG. 4 is an enlarged perspective view of the breakaway ogee lug assembly of the window unit of FIG. 1, showing an ogee lug component of the assembly partially removed from its breakaway hinge mount.
Figure 5:
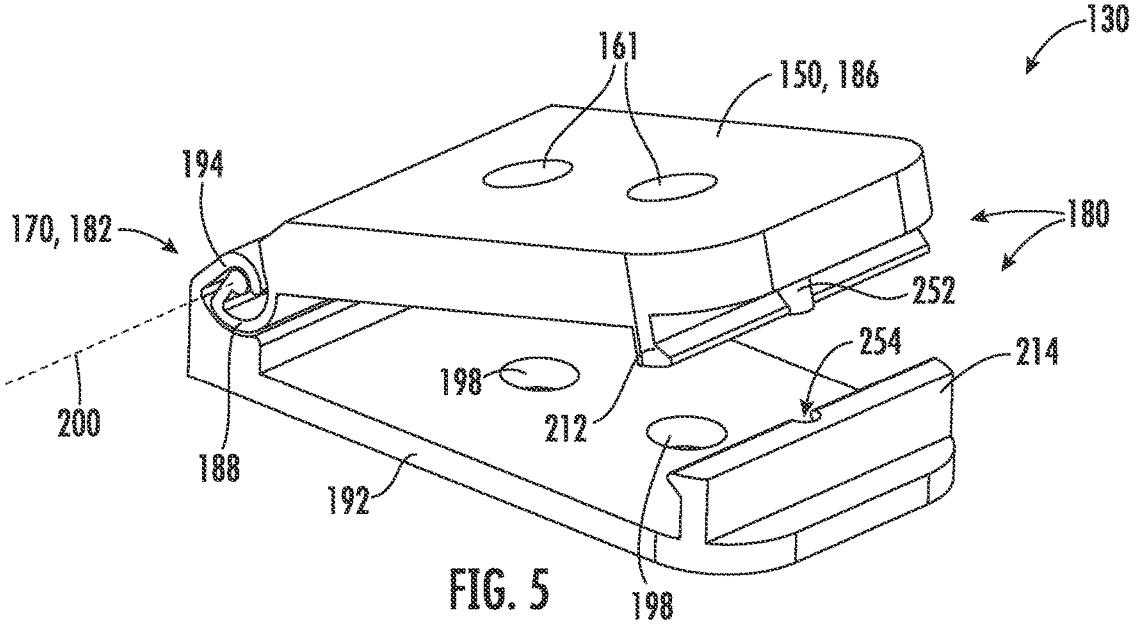
FIG. 5 is an enlarged perspective view of a hinged breakaway mount component of the breakaway ogee lug assembly of FIG. 4, with the ogee lug omitted for clarity.

FIG. 4 is a detail view of one of the sash lug assemblies 100 (the one illustrated in FIG. 1 as first ogee lug 102) in a partially disassembled condition, with the remainder of window 10 omitted for clarity. And FIG. 5 illustrates the releasable coupling 130 of sash lug assembly 100. In both FIGS. 4 and 5, the latch 180 of releasable coupling 130 is shown released. With reference to FIGS. 4 and 5, releasable coupling 130 preferably includes a first part that is integrally formed in the sash mount seat 150 and a second part that is attached to or integrally formed in lug body 140. In the embodiment illustrated, the hinge 170 of releasable coupling 130 includes a detachable hinge assembly 182 in which a first part is the sash mount seat 150, which comprises a sash leaf 186 having a first knuckle 188, and a second part is a lug leaf 192 having a second knuckle 194 that is rotatably engaged with the first knuckle 188. First knuckle 188 may be nested within second knuckle 194, as illustrated. In other embodiments, the first and second knuckles 188, 194 may be rotatably engaged in other ways well known in the hinge arts—for example through a hinge pin coupling the first and second knuckles 188, 194 together. In the embodiment illustrated, lug leaf 192 is securely fastened to lug body 140 via screws 196 or other fasteners which extend through holes 198 (FIG. 5) in lug leaf 192, but in other embodiments (not illustrated) lug leaf 192 may be formed as an integral part of lug body 140. The rotatable engagement between the first and second knuckles 188, 194 allows lug leaf 192 and lug body 140 to be rotated away from sash leaf 186 about a horizontally-extending pivot axis 200 of hinge assembly 182 that is created by the engagement of the first and second knuckles 188, 194.

The latch 180 preferably comprises a snap latch including a first latch part 212 (first snap latch part) integrally formed with sash leaf 186 and a second latch part 214 (second snap latch part) integrally formed with lug leaf 192. With reference to FIGS. 3 and 4, first and second knuckles 188, 194 are positioned proximal of the interior side 106 of upper sash 14, and latch 180 is positioned proximal of the exterior side 108 of upper sash 14, so that, when latch 180 is released or otherwise unlatched, either through application of force P or otherwise, an exterior side 218 of lug body 140 is released from sash mount seat 150 to allow lug body 140 and sash leaf 186 to rotate relatively away from each other about the horizontal pivot axis 200 of hinge assembly 182. Since the sash leaf 186 is carried by the inwardly-tilting upper sash 14 and the lug body 140 is constrained, in practice sash leaf 186 rotates away from lug leaf 192 and lug body 140 about horizontal pivot axis 200 as upper sash 14 is tilted inwardly for cleaning. Moreover, the relatively low release threshold force of latch 180 causes at least a portion (e.g. exterior side 218) of lug body 140 to release and "break-away" from upper sash 14 when upper sash 14 is tilted inwardly for cleaning. At the same time, the hinge 170 remains attached to retain lug body 140 to upper sash 14 along hinge 170, thereby preventing lug body 140 from being dropped or lost during cleaning. The force P (FIG. 3) to release the latch 180 may be a simple unidirectional or linear force vector applied to lug body 140 as a result of interference between free end 122, or some other portion of lug body 140, with jamb 26 of frame 20, insect screen 60, a perimeter frame of insect screen 60, or some other component of window 10, when upper sash 14 is tilted for cleaning. Thus, the latch 180 or other detachable coupling 130 can be released and the lug body 140 at least partially released from upper sash 14 to prevent damage, without requiring any direct manipulation of sash lug assembly 100. In some embodiments, a side of lug body 140 may be nested in a track of jamb 26 or otherwise sit behind a portion of frame 20, or of a frame of insect screen 60, so that tilting of upper sash 14 causes lug body 140 to contact frame 20, or frame of insect screen 60, to trigger the release of latch 180 or other releasable coupling 130. The horizontal pivot axis 200 is desirably positioned as close as possible to tilt axis 120 (FIG. 1) of upper sash 14, and preferably a distance less than the depth D2 of upper sash 14, so that the position of pivot axis 200 moves as little as possible when upper sash 14 is tilted for cleaning.

Turning again to FIGS. 4 and 5, lug body 140 may include a flange 230 that extends upwardly from a main portion 232 of lug body 140 that is located below releasable coupling 130 and more specifically below lug leaf 192. The flange 230 covers releasable coupling 130 along an exterior side thereof to obscure or hide releasable coupling 130 from being seen from the exterior of window 10, providing an aesthetically pleasing appearance. Flange 230 may include an upper end 234 that is beveled or otherwise shaped to match up with a corresponding stop surface 236 (FIG. 3) of meeting rail 50. Flange 230 may shield releasable coupling 130 from the harmful effects of environmental elements, such as sun (UV radiation), snow, ice, dirt and/or debris, and may discourage tampering. Flange 230 may be sized and shaped so that it presses against stop surface 236 of meeting rail 50, when latch 180 is latched, which may provide counterpressure or preload to latch 180, or may otherwise eliminate play in latch 180, which may prevent rattling or other undesirable conditions. Releasable coupling 130 may be seated in a notch 240 formed in lug body 140, defining a shoulder 244 of lug body 140 that lies approximately flush with an upper surface 248 of sash mount seat 150 and facing the underside 158 of meeting rail 50 when sash lug assembly 100 is attached to upper sash 14. Shoulder 244 may meet flange 230 at a corner of lug body 140 to further obscure releasable coupling 130 from view; and shoulder 244 may further shield releasable coupling 130 from environmental effects and/or tampering. Lug body 140 may be made of any of various materials, such as wood, fiberglass, composite wood fiber and plastic materials, metal, molded plastic, or any other materials known for use in fenestration systems. Lug body 140 may be solid or hollow, depending on the kind of material used. Advantageously, in a restoration project, materials such as wood and some composites may be customized in the field by cutting the ogee or other shape profile to match existing sash lugs on other windows of an existing building.

The first part of the releasable coupling 130, such as the sash leaf 186 and first knuckle 188, may be formed by extrusion in unitary one-piece construction. Thus, multiple sash leaves 186 or other first parts of the releasable coupling 130 may be made from a single elongate extrusion of a durable material, such as aluminum or plastic. Similarly, the lug leaf 192 and second knuckle 194 may be formed of aluminum, plastic, or another durable material by extrusion in a unitary one-piece construction. In other embodiments, the first and second parts of releasable coupling 130, may be machined from solid material or injection molded.

As illustrated in FIG. 4, when latch 180 is released, the first and second knuckles 188, 194 may be loosened so that the lug leaf 192 and second knuckle 194 can be manually slid along first knuckle 188. This allows lug body 140 and lug leaf 192 to be moved horizontally away from sash mount seat 150 in a direction parallel to and along pivot axis 200 for slidably detaching the detachable hinge assembly 182, and thereby detaching and removing lug body 140 from sash mount seat 150 and upper sash 140. The slidably detachable hinge assembly 182 of the illustrated embodiment facilitates installation of sash lug assembly 100 in the field by allowing assembly of releasable coupling 130 in the field after fastening sash mount seat 150 to meeting rail 50. Many other detachable hinge assemblies, including those not utilizing nested hinge assemblies, may provide similar or other benefits and may be used in place of hinge 170.

Latch 180 may include a projection or key 252 on one of its first and second latch parts 212, 214, and may further include a corresponding notch or keyway 254 in a mating surface of the other of the first and second latch parts 212, 214 such that the projection/key 252 and notch/keyway 254 are engaged and interlocked when the latch 180 is latched. The projection/key 252 and notch/keyway 254 may extend transversely to horizontal pivot axis 200 to thereby help prevent lug leaf 192, second knuckle 194, and lug body 140, from sliding in the direction of pivot axis 200 relative to sash leaf 186 and first knuckle 188 when latch 180 is latched. In the embodiment illustrated, latch 180 is in the form of a snap latch with both first and second latch parts 212, 214 of latch 180 including tabs having barbed ends that snap together and latch when the first and second latch parts 212, 214 are pressed together. In other embodiments (not illustrated) the snap latch may take other forms. In some embodiments, latch 180 may be formed as a grab latch, clip, snap-clip, hook, or pawl, or may include any variety of other latch forms or elements.

It will be obvious to those having skill in the art that many changes may be made to the details of the above-described embodiments without departing from the underlying principles of the invention. The scope of the present invention should, therefore, be determined only by the following claims.

The invention claimed is:

1. A breakaway sash lug assembly for a hung window, comprising:

a sash mount seat that is sized and configured for attachment to a window sash, the window sash normally positioned in a plane of the hung window;

a lug body rigidly attached to the sash mount seat via a releasable coupling, the releasable coupling including a detachable hinge assembly and a latch, the lug body having a free end projecting downwardly away from the sash mount seat, the latch being configured to release at least one side of the lug body from the sash mount seat upon application of a release force to the free end of the lug body in a direction perpendicular to the plane of the hung window, to thereby inhibit damage from inadvertent contact between the lug body and other portions of the hung window.

2. The breakaway sash lug assembly of claim 1, wherein the release force is no less than 0.1 pounds force to not more than 50 pounds-force.

3. The breakaway sash lug assembly of claim 1, wherein the release force is at least 0.1 pounds-force (lbf), or at least 0.25 lbf, or at least 1.0 lbf, or at least 2.0 lbf, or at least 3.0 lbf, or at least 4.0 lbf, or at least 5.0 lbf, and the release force is not more than 50 lbf, or not more than 40 lbf, or not more than 30 lbf, or not more than 15 lbf.

4. The breakaway sash lug assembly of claim 1, wherein the releasable coupling includes a snap attachment.

5. The breakaway sash lug assembly of claim 1, wherein the sash mount seat is configured for attachment to a meeting rail of the window sash.

6. The breakaway sash lug assembly of claim 1, wherein the releasable coupling includes a first part integrally formed in the sash mount seat and a second part integrally formed in the lug body.

7. The breakaway sash lug assembly of claim 1, wherein, when the latch is unlatched, the lug body is movable horizontally away from the sash mount seat for detaching the hinge assembly to remove the lug body from the window sash.

8. The breakaway sash lug assembly of claim 1, wherein the detachable hinge assembly includes:

the sash mount seat comprising a sash leaf securable to the window sash, the sash leaf including a first knuckle; and a lug leaf securely attached to the lug body or formed as an integral part of the lug body, the lug leaf including a second knuckle that is rotatably engaged with the first knuckle of the sash leaf to allow the lug leaf and the lug body to be rotated away from the sash leaf about a horizontal axis created by the engagement of the second knuckle with the first knuckle.

9. The breakaway sash lug assembly of claim 8, wherein the latch comprises a snap latch including a first snap latch part integrally formed with the sash leaf and a second snap latch part integrally formed with the lug leaf.

10. The breakaway sash lug assembly of claim 8, wherein the window sash includes opposite interior and exterior sides, the first and second knuckles are positioned proximal of the interior side of the window sash, and the latch is positioned proximal of the exterior side of the window sash.

11. The breakaway sash lug assembly of claim 8, wherein, when the latch is unlatched, the second knuckle is slidable along the first knuckle to allow the lug body and lug leaf to be slidably detached from the sash mount seat.

12. The breakaway sash lug assembly of claim 8, wherein:

the sash leaf and first knuckle are formed by extrusion in unitary one-piece construction; and the lug leaf and second knuckle are formed by extrusion in unitary one-piece construction.

13. The breakaway sash lug assembly of claim 1, wherein the lug body includes a flange that extends upwardly from a main portion of the lug body to cover the releasable coupling.

14. A hung window including the breakaway sash lug assembly of claim 1 attached to the window sash of the hung window, and wherein the window sash is tiltable inwardly for cleaning.

15. A breakaway sash lug assembly for a hung window including a window sash, comprising:

a lug body; and a detachable hinge assembly rigidly for detachably supporting the lug body on the window sash, the detachable hinge assembly including:

a sash leaf configured for securement to the window sash, the sash leaf including a first knuckle; and a lug leaf securely attached to the lug body or forming an integral part of the lug body with the lug body depending downwardly from the lug leaf and away from the sash leaf and the window sash, the lug leaf including a second knuckle that is rotatably engaged with the first knuckle of the sash leaf to allow the lug leaf and the lug body to be rotated relatively away from the sash leaf about a horizontal axis created by the engagement of the second knuckle with the first knuckle.

16. The breakaway sash lug assembly of claim 15, further comprising a latch.

17. The breakaway sash lug assembly of claim 16, wherein the latch comprises a first latch part integrally formed with the sash leaf and a second latch part integrally formed with the lug leaf.

18. The breakaway sash lug assembly of claim 16, wherein the window sash includes opposite interior and exterior sides, the first and second knuckles are positioned proximal of the interior side of the window sash, and the latch is positioned proximal of the exterior side of the window sash.

19. A hung window including the breakaway sash lug assembly of claim 18 attached to the window sash of the hung window, and wherein the window sash is tiltable inwardly for cleaning.

* * * * *